(12) United States Patent
Basilier et al.

(10) Patent No.: US 9,894,692 B2
(45) Date of Patent: Feb. 13, 2018

(54) TRANSMISSION OF DATA TO OR FROM A NODE OF A MOBILE NETWORK

(75) Inventors: Henrik Basilier, Täby (SE); Reiner Ludwig, Hürtgenwald (DE); Magnus Olsson, London (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 545 days.

(21) Appl. No.: 14/349,693

(22) PCT Filed: Oct. 6, 2011

(86) PCT No.: PCT/EP2011/067506
§ 371 (c)(1),
(2), (4) Date: Apr. 4, 2014

(87) PCT Pub. No.: WO2013/050079
PCT Pub. Date: Apr. 11, 2013

(65) Prior Publication Data
US 2014/0241305 A1 Aug. 28, 2014

(51) Int. Cl.
*H04W 76/02* (2009.01)
*H04L 29/08* (2006.01)
*H04L 29/12* (2006.01)

(52) U.S. Cl.
CPC ........... *H04W 76/021* (2013.01); *H04L 61/35* (2013.01); *H04L 67/28* (2013.01)

(58) Field of Classification Search
CPC ....... H04L 61/35; H04L 67/28; H04W 76/021
(Continued)

(56) References Cited

U.S. PATENT DOCUMENTS

| 8,478,331 B1 * | 7/2013 | Rogers | H04W 28/065 |
| | | | 455/3.01 |
| 2003/0013446 A1 * | 1/2003 | Haumont | H04W 36/12 |
| | | | 455/436 |

(Continued)

FOREIGN PATENT DOCUMENTS

| EP | 2296403 A1 * | 3/2011 | ......... H04B 7/15542 |
| EP | 2387180 A1 | 11/2011 | |

(Continued)

*Primary Examiner* — Melvin Marcelo
*Assistant Examiner* — Natali N Pascual Peguero
(74) *Attorney, Agent, or Firm* — Murphy, Bilak & Homiller, PLLC

(57) ABSTRACT

For transmitting data between a node (100) of a mobile network and a further node (200), the further node sends downlink data packets to the node (100) of the mobile network. The downlink data packets carry a destination address corresponding to a user equipment (10) connected to the mobile network. For implementing an inband data channel between the node (100) of the mobile network and the further node (200), the further node (200) inserts data destined to the node (100) of the mobile network into at least one of the downlink data packets and marks this downlink data packet as including data destined to the node (100) of the mobile network. The node (100) of the mobile network receives the downlink data packets from the further node (200) and identities, on the basis of the marking, the least one downlink data packet including data destined to the node (100) of the mobile network. The node (100) of the mobile network then extracts the data from the identified downlink data packet. A corresponding inband data channel may also be used in the uplink direction.

26 Claims, 11 Drawing Sheets

(58) Field of Classification Search
USPC .......................... 370/329, 355, 395.52, 912
See application file for complete search history.

(56) References Cited

U.S. PATENT DOCUMENTS

| | | |
|---|---|---|
| 2003/0140130 A1 | 7/2003 | Evrard et al. |
| 2004/0148425 A1* | 7/2004 | Haumont .......... H04L 29/06027 709/236 |
| 2005/0282548 A1* | 12/2005 | Kim .................. H04W 36/0055 455/436 |
| 2007/0038753 A1* | 2/2007 | Jorgensen ................ H04L 1/20 709/226 |
| 2008/0034410 A1* | 2/2008 | Udupa ................ H04L 63/0272 726/5 |
| 2008/0311855 A1* | 12/2008 | Manousakis .......... H04W 28/06 455/67.11 |
| 2010/0062765 A1* | 3/2010 | Jung ................ H04W 36/0088 455/434 |
| 2011/0173291 A1* | 7/2011 | Alakoski ............... H04L 12/581 709/217 |

FOREIGN PATENT DOCUMENTS

| | | | |
|---|---|---|---|
| WO | WO 2006109006 A1 * | 10/2006 | ............ H04L 47/10 |
| WO | 2010133911 A1 | 11/2010 | |

* cited by examiner

TRANSMISSION OF DATA TO OR FROM A NODE OF A MOBILE NETWORK

TECHNICAL FIELD

The present invention relates to methods for transmission of data to or from a node of a mobile network and to corresponding nodes.

BACKGROUND

In some situations, exchange of certain information with a node of a mobile network, e.g., a node of a Radio Access Network (RAN), may be useful for other nodes, which may be located outside the mobile network or in a different section of the mobile network. Examples of such other nodes are nodes implementing application functions and nodes of acceleration or optimization functions which, in view of the hierarchy of the mobile network, are located above the core network. The other node may for example obtain user-level information on radio conditions, position of a user equipment (UE), such as an identity of a cell the UE is associated with, or capacity of the RAN. On the other hand, a node in the RAN may also benefit from information provided by the other node, e.g., from information on services used by a certain user. In the RAN, such information may for example be valuable as additional input to radio resource management procedures.

However, such exchange of information is not straightforward to implement. For example, although communication between nodes of the mobile network may be implemented on the basis of a packet network, the node of the mobile network may be provided with a network address which is not externally routable. For example, a node of a RAN could be provided with an Internet Protocol (IP) address selected from a private address subrange. Further, the network address of the node could be unknown to other nodes, and these nodes will not know how to address the node of the mobile network. Accordingly, such a network address would not be suitable for establishing a communication channel from other nodes outside the RAN.

Accordingly, there is a need for techniques which allow for efficiently implementing exchange of information with respect to a node of a mobile network.

SUMMARY

According to an embodiment of the invention, a method of transmitting data between a node of a mobile network and a further node is provided. According to this method, the node of the mobile network receives downlink (DL) data packets from the further node. The DL data packets carry a destination address corresponding to a UE connected to the mobile network. In addition, the node identifies, on the basis of a marking of at least one of the DL data packets, this DL data packet as including data destined to the node of the mobile network. The node of the mobile network then extracts the data destined to the node of the mobile network from the identified DL data packet.

According to a further embodiment of the invention, a method of transmitting data between a node of a mobile network and a further node is provided. According to this method, the further node sends DL data packets to the node of the mobile network. The DL data packets carry a destination address corresponding to a UE connected to the mobile network. In addition, the further node inserts data destined to the node of the mobile network into at least one of the DL data packets. The further node also marks the at least one DL data packet as including data destined to the node of the mobile network.

According to a further embodiment of the invention, a method of transmitting data between a node of a mobile network and a further node is provided. According to this method, the node of the mobile network sends uplink (UL) data packets to the further node. The UL data packets carry a source address corresponding to a UE connected to the mobile network. In addition, the node inserts data provided by node of the mobile network into at least one of the UL data packets. The node of the mobile network also marks the at least one UL data packet as including data provided by the node of the mobile network.

According to a further embodiment of the invention, a method of transmitting data between a node of a mobile network and a further node is provided. According to this method, the further node receives UL data packets from the node of the mobile network. The UL data packets carry a source address corresponding to a UE connected to the mobile network. In addition, the further node identifies, on the basis of a marking of at least one of the UL data packets, this UL data packet as including data provided by the node of the mobile network. The further node then extracts the data provided by the node of the mobile network from the identified UL data packet.

According to a further embodiment of the invention, a node for operation in a mobile network is provided. The node comprises an access interface for connecting to at least one UE, a network interface for connecting to a further node, and a processor. The processor is configured to receive, via the network interface, DL data packets from the further node. The DL data packets carry a destination address corresponding to a UE connected to the access interface. Further, the processor is configured to identify, on the basis of a marking of at least one of the DL data packets, this DL data packet as including data destined to the node and to extract the data destined to the node from the identified DL data packet.

According to a further embodiment of the invention, a node is provided. The node comprises a packet interface and a processor. The processor is configured to send, via the packet interface, DL data packets to a node of a mobile network. The DL data packets carry a destination address corresponding to a UE connected to the mobile network. Further, the processor is configured to insert data destined to the node of the mobile network into at least one of the DL data packets and to mark this DL data packet as including data destined to the node of the mobile network.

According to a further embodiment of the invention, a node for operation in a mobile network is provided. The node comprises an access interface for connecting to at least one UE, a network interface for connecting to a further node, and a processor. The processor is configured to send, via the network interface, UL data packets to the further node. The UL data packets carry a source address corresponding to a UE connected to the access interface. Further, the processor is configured to insert data provided by the node of the mobile network into at least one of the UL data packets and to mark this UL data packet as including data provided by the node of the mobile network.

According to a further embodiment of the invention, a node is provided. The node comprises a packet interface and a processor. The processor is configured to receive, via the packet interface, UL data packets from a node of a mobile network. The UL data packets carry a source address corresponding to a UE connected to the mobile network._

Further, the processor is configured to identify, on the basis of a marking of at least one of the UL data packets, this UL data packet as including data provided by the node of the mobile network and to extract the data from the identified UL data packet.

According to further embodiments, other methods, nodes, or systems combining two or more of the above nodes may be provided.

DETAILED DESCRIPTION OF EMBODIMENTS

In the following, the invention will be explained in more detail by referring to exemplary embodiments and to the accompanying drawings. The illustrated embodiments relate to concepts for transmission of data to or from a node of a mobile network. The concepts may be applied. In particular, the concepts may be implemented in a mobile network supporting packet data communication with end devices, such as in a mobile network according to the 3GPP Technical Specifications, e.g., using General Packet Radio Service (GPRS) or 3GPP Long Term Evolution (LTE) for implementing packet data communication. However, it is to be understood that the illustrated concepts may be applied in other types of mobile network as well.

Figure 1:
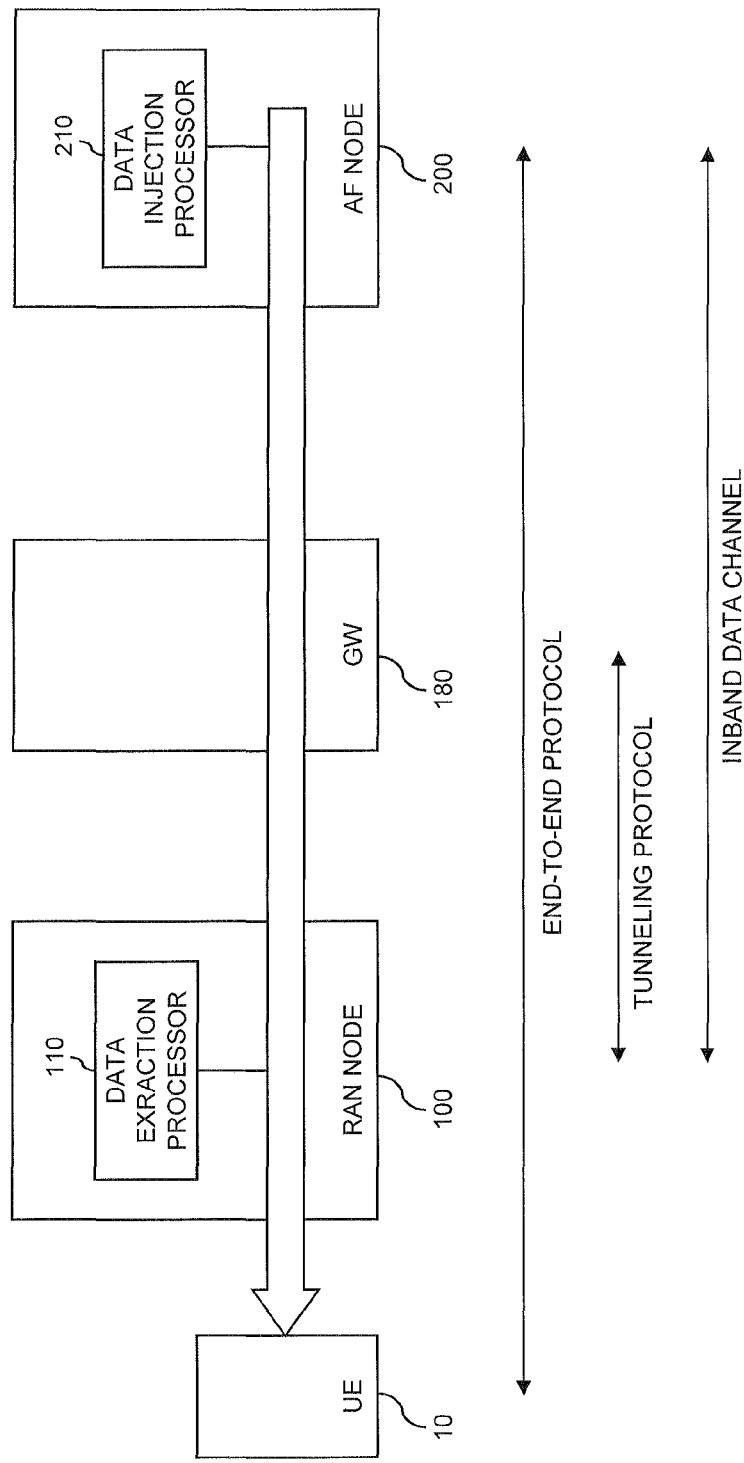
FIG. 1 schematically illustrates a mobile network environment in which concepts according to an embodiment of the invention are used for transmission of data to a node of a mobile network.

FIG. 1 schematically illustrates a mobile network environment in which concepts according to embodiments of the invention the invention are applied for transmission of data to a node 100 of a mobile network. In the illustrated example, the node 100 of the mobile network is a node of a RAN, in the following also referred to as RAN node. For example, the node 100 may be a base station such as a Node B or an evolved Node B (eNB), or a control node of the RAN, such as a Radio Network Controller (RNC).

As further illustrated, a UE 10 is attached to the RAN node 100 and receives DL data packets from a further node 200. In the illustrated example, the further node 200 is a node for implementing an application function (AF), in the following also referred to as AF node. The RAN node 100 and the AF node 200 communicate via a gateway (GW) 180, e.g., a Packet Data Network (PDN) gateway or a Gateway GPRS Support Node (GGSN).

Packet data communication between the UE 10 and the AF node 200 may be implemented on the basis of multiple protocols. For example, as illustrated in FIG. 1, an end-to-end protocol, such as the Hypertext Transfer Protocol (HTTP), the Transport Control Protocol (TCP) or User Datagram Protocol (UDP), and the Internet Protocol (IP) may be used for implementing the end-to-end protocol. In addition, a tunneling protocol, such as the GPRS Tunneling Protocol (GTP) for implementing communication between the gateway 180 and the RAN node 100.

Accordingly, communication of data from the AF node 100 to the UE 10 may be implemented by sending DL data packets from the AF node 100 to the UE 10. For this purpose, the DL data packets would be addressed to a network address assigned to the UE 10, e.g., an IP address.

The concepts according to some embodiments as described in the following have the purpose of allowing the AF node 200 to send data to the RAN node 100, without requiring changes to intermediate nodes, such as the gateway 180, and without requiring a network address of the RAN node 100 which can be used by the AF node 200 for directly addressing the RAN node 100. For example, the RAN node 100 could be provided with a network address which is not suitable for direct addressing by the AF node 200 because this network address is not known to the AF node 200 or because this network address is not externally routable.

This may be achieved by "disguising" DL data packets including the data destined to the RAN node 100 as normal user data packets, i.e., as data packets including data destined to the UE 10, thereby forming an inband data channel between the RAN node 100 and the AF node 200. Since the inband data channel is based on disguised DL data packets, the communication is transparent to a packet core of the mobile network and no interoperability issues exist in relation to the packet core. The data destined to the RAN node 100 may for example include information on services hosted by the AF node 200. At the RAN node 100, such information could for example be used as input to radio management procedures. The data destined to the RAN node may also include a request for information provided by the RAN node 100. Such information provided by the RAN node 100 could in turn include information on the location of one or more UE, e.g., the UE 10, user-level information on radio conditions, information on a capacity or load of the RAN, or the like.

For implementing the disguising of the DL data packets, the AF node 200 may include the data destined to the RAN node 100 into one or more DL data packets carrying a destination address which corresponds to the network address of the UE 10, and mark these DL data packets as including data destined to the RAN node 100. For this purpose, the AF node 200 is provided with a data injection processor 210. The RAN node 100 may in turn identify, on the basis of this marking, the DL data packets as including data destined to the RAN node 30 100 and extract the data destined to the RAN node therefrom. For this purpose, the RAN node 100 is provided with a data extraction processor 110. The DL data packets including the data destined to the RAN node 100 may be generated by the AF node 200 exclusively for transmitting the data to the RAN node 100. Alternatively, the data destined to the RAN node 100 may also be included into data packets carrying payload data destined to the UE 10, e.g., be "piggy backed" into the DL data packets carrying payload data destined to the UE 10.

The piggy backing of data destined to the RAN node into the DL data packets may for example be achieved by altering bits/flags of a protocol, such as the TCP protocol, locally between the AF node 200 and the RAN node 100. This means that the data injection processor 210 would introduce the alterations into the DL data packets, thereby encoding the data, and the data extraction processor 110 would decode the data from the alterations and undo the alterations before forwarding the DL data packets to the UE 10. Further, the data destined to the RAN node 100 could also be included into a suitable information element defined by a protocol, e.g., by modifying and/or enriching a HTTP header.

The marking of the DL data packets may for example be accomplished by using a dedicated IP protocol identifier in the IP header of the DL data packets and/or by using a dedicated port number, such as a TCP or UDP port number.

Figure 2:
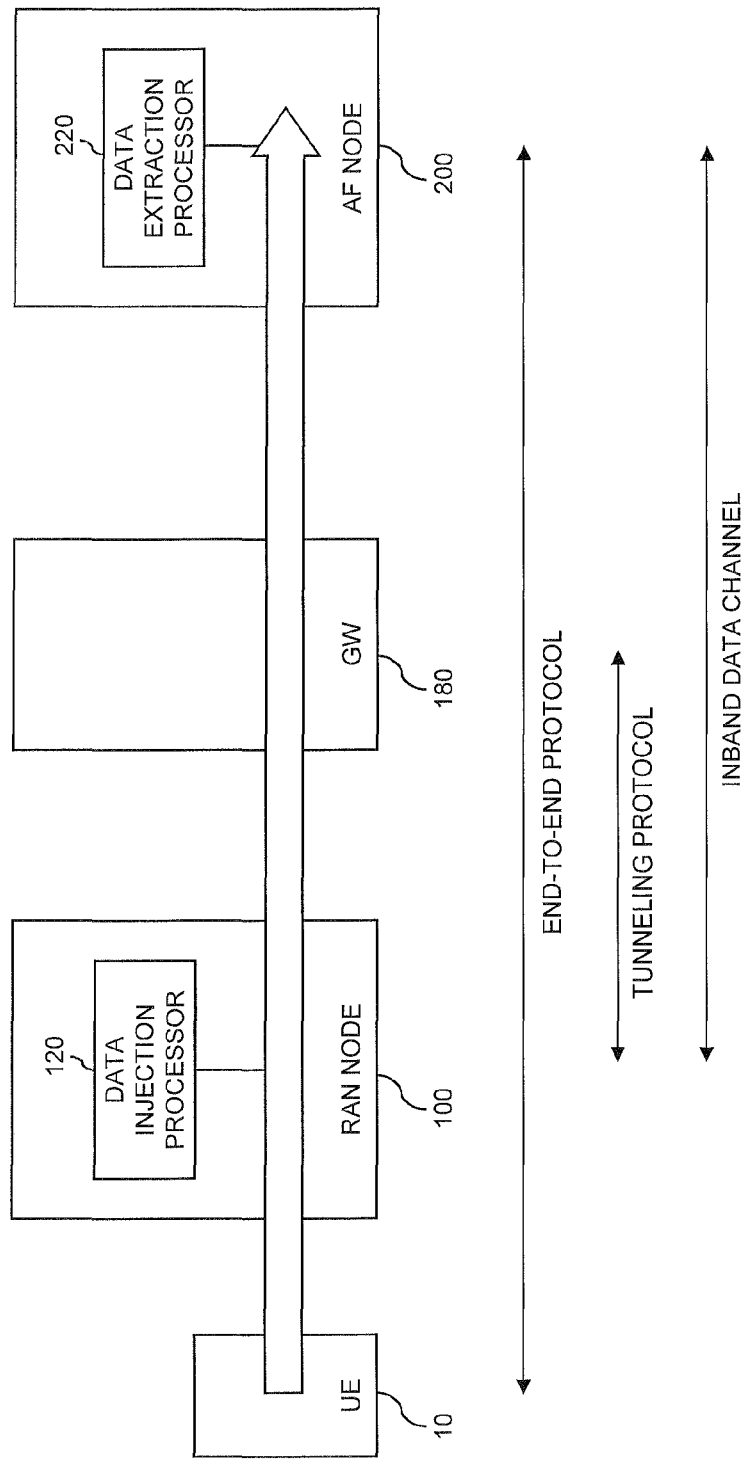
FIG. 2 schematically illustrates a mobile network environment in which concepts according to an embodiment of the invention are used for transmission of data from a node of a mobile network.

Similar concepts may also be used for transmission of data from a node of a mobile network. A corresponding scenario is illustrated in FIG. 2, which again shows the UE 10, the RAN node 100, the gateway 180, and the AF node 200. In the scenario of FIG. 2, communication of data from the UE 10 to the AF node 200 may be implemented by sending UL data packets from the UE 10 to the AF node 200. These UL data packets would be addressed to a network address assigned to the UE 10 and carry a source address which corresponds to the network address assigned to the UE 10.

In the scenario of FIG. 2, the RAN node 100 may include data provided by the RAN node 100 into UL data packets which are sent to the AF node 200, thereby forming an inband data channel between the RAN node 100 and the AF node 200. These UL data packets may also be marked as including data provided by the RAN node 100. For this purpose, the RAN node 100 is provided with a data injection processor 120. The AF node 200 may in turn identify, on the basis of the marking, the UL data packets as including data provided by the RAN node 100 and extract the data provided by the RAN node 100 therefrom. For this purpose, the AF node 200 is provided with a data extraction processor 220. The data provided by the RAN node 100 may for example include information on the location of one or more UE, e.g., the UE 10, user-level information on radio conditions, information on a capacity or load of the RAN, or the like.

The UL data packets carrying the data provided by the RAN node 100 may be disguised as normal user data packets by providing them with a source address corresponding to the network address assigned to the UE 10. Due to the disguising of the UL data packets, the communication is transparent to a packet core of the mobile network and no interoperability issues exist in relation to the packet core. The UL data packets may be received from the UE 10 and forwarded by the RAN node 100 after including the data provided by the RAN node 100, i.e., the data provided by the RAN node 100 may be piggy backed into data packets from the UE 10. Alternatively, the UL data packets may be generated at the RAN node 100 exclusively for transmitting the data provided by the RAN node 100.

The piggy backing of the data provided by the RAN node 100 into data packets from the UE 10 may for example be achieved by altering bits/flags of a protocol, such as the TCP protocol, locally between the RAN node 100 and the AF node 200. This means that the data injection processor 120 would introduce the alterations into the UL data packets, thereby encoding the data, and the data extraction processor 220 would decode the data from the alterations and undo the alterations before forwarding the UL data packets to further processing in the AF node 200, e.g., to processing of higher protocol layers. Further, the data provided by the RAN node 100 could also be included into a suitable information element defined by a protocol, e.g., by modifying and/or enriching a HTTP header.

The marking of the UL data packets may for example be accomplished by using a dedicated IP protocol identifier in the IP header of the UL data packets and/or by using a dedicated port number, such as a TCP or UDP port number.

The above-mentioned disguising of DL or UL data packets may also take into account the protocols used for packet data communication between the UE 10 and the AF node 200. That is to say, the disguised data packets may be provided with the same type of protocol headers as normal data packets carrying payload data to or from the UE 10. Exemplary structures of data packets are shown in FIGS. 3 and 4.

Figure 3:
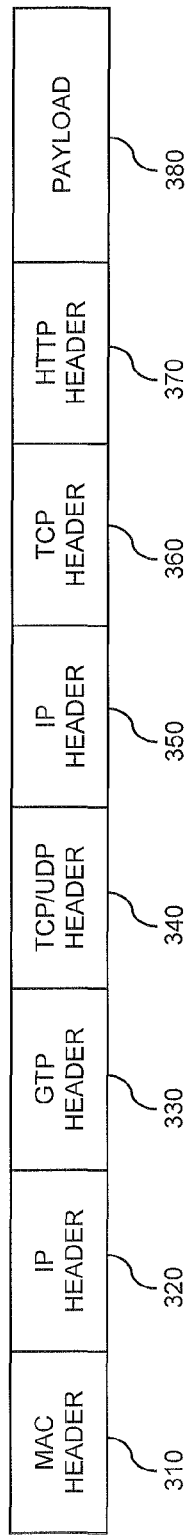
FIG. 3 schematically illustrates the structure of data packets as used in the mobile network of FIGS. 1 and 2.

FIG. 3 schematically illustrates the structure of a DL or UL data packet as used between the gateway 180 and the RAN node 100. As illustrated, the data packet includes a number of protocol headers 310, 320, 330, 340, 350, 360, 370 and a payload section 380. The protocol headers 310, 320, 330, 340, 350, 360, 370 correspond to different protocol layers used for implementing packet data communication. In the illustrated example, the protocol headers 310, 320, 330, 340, 350, 360, 370 include a Media Access Control (MAC) header 310, an outer IP header 320, a GTP header 330, an outer TCP or UDP header 340, an inner IP header 350, an inner TCP header 360, and a HTTP header 370.

Figure 4:
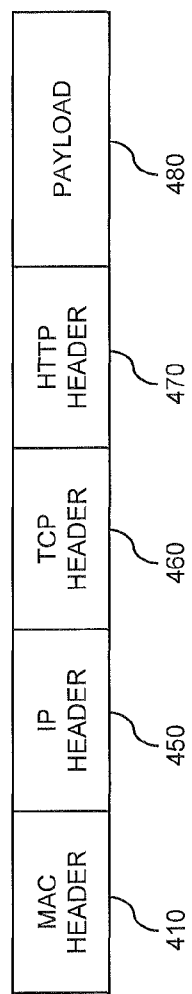
FIG. 4 schematically illustrates the structure of further data packets as used in the mobile network of FIGS. 1 and 2.

FIG. 4 schematically illustrates the structure of a DL or UL data packet as used between the gateway 180 and the AF node 200. As illustrated, the data packet includes a number of protocol headers 410, 450, 460, 470, and a payload section 480. The protocol headers 410, 450, 460, 470 correspond to different protocol layers used for implementing packet data communication. In the illustrated example, the protocol headers 410, 450, 460, 470 include a Media Access Control (MAC) header 410, an IP header 450, a TCP header 460, and a HTTP header 470.

As can be seen, the data packets as used between the gateway 180 and the RAN node 100 include some additional protocol headers as compared to the data packets as used between the gateway 180 and the AF node 200. The additional protocol headers are due to the use of the tunneling protocol between the gateway 180 and the AF node 200. For efficiently disguising the data packets, such additional protocol headers may also be used in the DL data packets including the data destined to the RAN node 100 and in the UL data packets including the data provided by the RAN node 100. Here, it is to be understood that the data injection processor 120 at the RAN node 100 may add such protocol headers to the UL data packets even if the UL data packets are exclusively used for the transmission of the data provided by the RAN node 100 and locally generated at the RAN node 100. On the other hand, there is no need for the data injection processor 110 at the AF node 200 to add such protocol headers, because these are introduced at the gateway 180.

The above functionalities of the RAN node 100 and the AF node 200 may be applied in various ways for implementing transmission of data between the RAN node 100, and the AF node 200.

For example, the AF node 200 may request certain information from the RAN node 100 by first sending a message in at least one disguised DL data packets to the RAN node 100. For example, the RAN node 100 may offer the information in the form of a service, and the AF node 200 may subscribe to this service. On the basis of the subscription, the RAN node 100 may then automatically notify the AF node 200 with the information. However, also individual request-response transactions could be implemented, e.g., on the basis of TCP. When applying the functionalities as described in connection with FIG. 1, this would mean that the DL data packet carries the IP address of the UE 10 as destination address, but is marked as including data destined to the RAN node 100, e.g., by means of a specific protocol identifier and/or port number. This marking in turn allows the RAN node 100 to intercept the DL data packet.

The RAN node 100 may then generate the requested information and respond to the AF node 200 by sending a message in at least one UL data packet. The initial message from AF node 200 may indicate an IP address of the AF node 200, and the RAN node may send the UL data packet to this IP address. The RAN node 100 may send the message either immediately or at certain events, such as a cell change, upon reaching a certain congestion level, or the like.

The UL data packet including the message from the RAN node 100 may be disguised as well, using the functionalities as described in connection with FIG. 2. For this purpose it may also be equipped with additional protocol headers as explained in connection with FIGS. 3 and 4, e.g., by providing the outer IP header 320, the GTP header 330, and the outer TCP or UDP header 340. The inner IP header 350 could in turn carry the IP address of the AF node 200 as destination address. Accordingly, the UL data packet is routed to the AF node 200 once it reaches the gateway 180.

As mentioned above, the RAN node 100 could may use various ways of including the data into the UL data packet, e.g., by sending dedicated UL data packets or by using piggy backing on the TCP level or on the HTTP level. When using piggy backing on the TCP level, the data provided by the RAN node 100 may be encoded by altering TCP flags or bits in the RAN node 100. In the AF node 200, the data may be decoded from the alterations, and the alterations may be undone in order to ensure compatibility with the further processing of the UL data packet. In order to avoid compatibility issues, the AF node 200 may also inform the RAN node 100 of its capability to undo alterations of TCP bits or flags. The RAN node 100 can then assume that such alterations can safely be made. When using piggy backing on the HTTP level, the HTTP header 370 may be supplemented by additional elements carrying the data provided by the RAN node 100, which is also referred to as HTTP header enrichment. Also in this case, the data provided by the RAN node 100 may be removed by the AF node 200 before forwarding the UL data packet to further processing, thereby avoiding undesired spreading of the data provided by the RAN node 100, e.g., to an internet server associated with the AF node 200. The AF node 200 may also inform the RAN node 100 of its capability to remove the added data from the HTTP header so that the RAN node 100 can safely add the data even if it is not desired to further spread the data.

In some scenarios, a security mechanism may be provided to ensure that the AF node 200 is a trusted source. For example, the security mechanism could be implemented by including a digital signature in the initial message sent to the RAN node 100. As an alternative or in addition, firewall filtering could be applied on the DL data packets directed to the RAN node 100 to only allow packets with the marking if they come from a trusted source.

In some scenarios, the AF node 200 does not need to intercept UL data packets and extract data therefrom in the same way as done at the RAN node 100 since the AF node 200 may have a routable IP address, which could for example be known to the RAN node 100. However, interception and extraction could also be used at the AF node 200, as explained in connection with FIG. 2.

It may also occur that the UE 10 is connected to some other RAN node, which does not support the above functionalities of intercepting DL data packets and extracting data therefrom. Accordingly, the DL data packets carrying the data destined to the RAN node might be forwarded to the UE 10. Typically this will result in an IP stack in the UE 10 dropping these DL data packets.

In some scenarios, charging rules may be adapted to prevent the DL or UL data packets carrying data destined to the RAN node 100 or provided by the RAN node 100 from creating charging events. For example, such charging rules may be configured in the gateway 180.

In some scenarios, also mobility of the UE 10 may be taken into account, e.g., by passing a subscription of the AF node 200 for information related to the UE 10 from the RAN node 100 to another RAN node if the UE 10 connects to this other RAN node, e.g., due to a handover.

In some scenarios, also mobility of the UE 10 in idle mode, i.e., without active connection to a RAN, may be taken into account. For example, impact on the core network and multi-vendor issues may be mitigated by avoiding modifications on the Mobility Management Entity (MME) or Serving GPRS Support Node (SGSN). This may for example be achieved by the RAN node 100 initiating the communication towards the AF node 200 on the inband data channel when the UE 10 goes into active mode, but not during idle mode of the UE 10. Further, this could be achieved by the AF node 200 polling the desired information from the RAN node 100 by generating new requests for the information from the RAN node 100, e.g., on a regular basis or on demand. Further, this could be achieved by the RAN node 100 informing the AF node 200 when the UE 10 goes into idle mode. The AF node 200 can then detect traffic to or from the UE 10, and in response to detecting such traffic, the AF node 200 can generate a new request for the information for the information from the RAN node 100. Still further, this can be achieved by using a RAN controller that keeps the UE 10 context in idle mode and can detect and forward the context to a new RAN controller node when the UE goes to active mode.

To avoid paging the UE 10, the AF node 200 may consider when to send the DL data packets of the inband data channel towards the RAN node 100. If the UE 10 is in idle mode, this may cause the MME or SGSN to initiate paging of the UE 10. Although this will not be noticeable for the user at the UE 10, it may cause battery drain and additional load on the system. Paging of the UE 10 can be avoided as far as possible, if the AF node 200 schedules sending of the DL data packets of the inband data channel based on information on an activity status of the UE 10. The AF node 200 may obtain this information based on radius triggers, based on traffic detection, and/or from UL data packets from the UE 10. In some scenarios, paging of the UE 10 may also be avoided by sending the DL packets of the inband data channel as responses to UL data packets received from the UE 10.

It is to be understood that the above described concepts are not limited to be applied to transmission of data between a RAN node and an AF node, but can also be applied to transmission of data between some other node of a mobile network and some other further node, e.g., between a GGSN and an external node performing Deep Packet Inspection (DPI). Also, the AF node 200 does not need to be an external node, but could be provided in the mobile network and could also be integrated within some node of the mobile network. For example, the AF node 200 could be a function within a GGSN. An example of such an integrated usage would be to monitor results from DPI and feed some information, such as service type or the like, to a RAN node or some other node using the inband data channel. The AF node 200 could also be a Policy and Charging Rules Function (PCRF).

Figure 5:
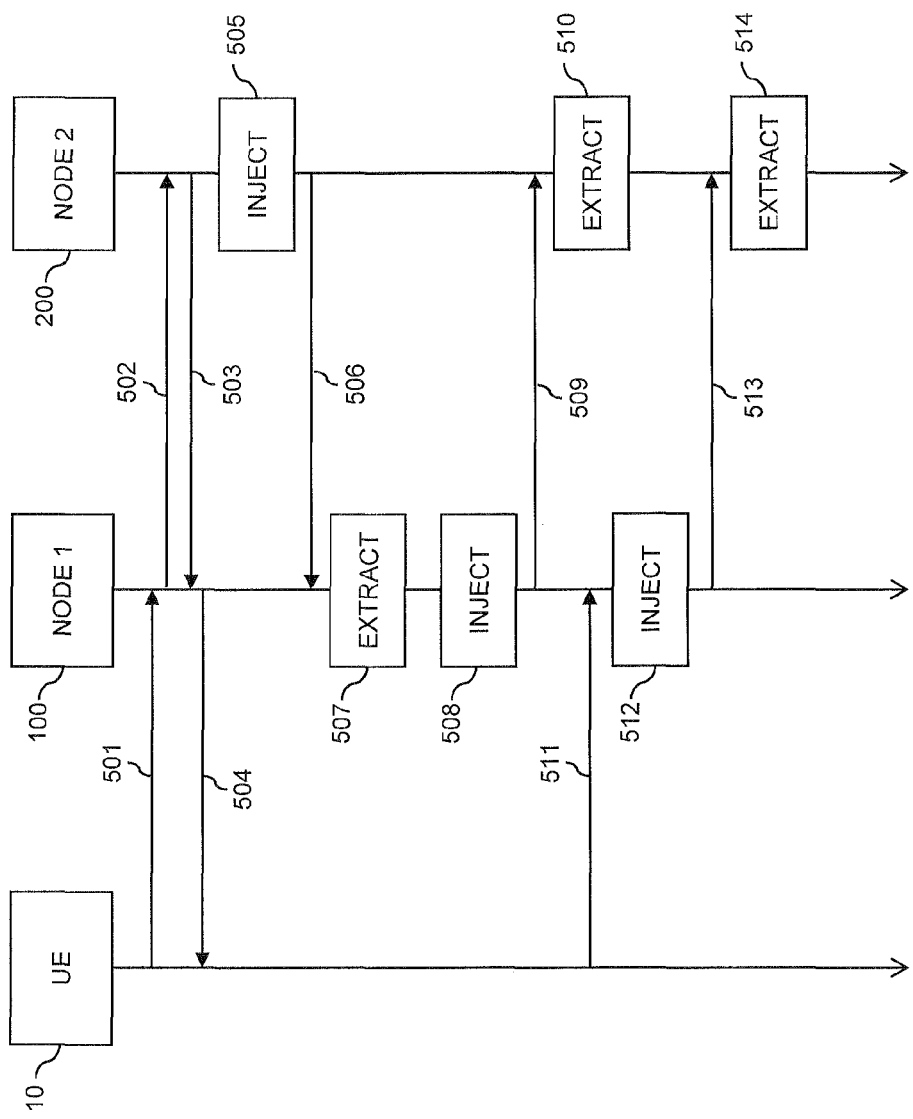
FIG. 5 shows a flowchart for illustrating an exemplary process of transmitting data between a node of a mobile network and a further node.

An exemplary process of transmitting data between a node 100 of a mobile network and a further node 200 using the above concepts is illustrated by FIG. 5. FIG. 5, illustrates a UE 10, the node 100, and the further node 200. As in the above examples, the node 100 may be a RAN node, such as a Node B, an eNB, or an RNC. Similarly, the further node 200 may be an AF node. However, it is to be understood that the concepts may also be applied to other types of nodes.

As illustrated, the UE 10 and the node 200 may communicate by sending UL data packets 501, 502 from the node 100 to the node 200, and by sending DL data packets 503, 504 from the node 200 to the UE 10. This is accomplished via the node 100, which receives the UL data packets 501 from the UE 10 and forwards them as the UL data packets 502 to the node 200, and which further receives the DL data packets 503 from the node 200 and forwards them as the DL data packets 504 to the UE 10. The UL data packets 501, 502 and the DL data packets 503, 504 may carry user traffic, such as HTTP traffic, to or from the UE 10. It is to be understood that the illustrated sequence of UL data packets 501, 502 and subsequent DL data packets 503, 504 is merely exemplary. In other scenarios, UL data packets may be transmitted after DL data packets, or only one of UL data packets or DL data packets may be transmitted. Also, the transmission of UL and/or DL data packets may occur frequently, e.g., as a part of a packet flow between the UE 10 and the node 200.

It is now assumed that the node 200 needs to obtain certain information from the node 100, but has no way of directly addressing the node 100, e.g., because the IP address of the node 100 is not known to the node 200 or is not routable from the node 200. The node 100 may be configured to automatically send the desired information to nodes which are registered at the node 100 to receive the information, which is also referred to as "subscription". The information may be information which is locally generated or maintained at the node 100. For example, if the node is a RAN node, the information may include location information related to the UE 10, such as a radio cell to which the UE 10 is connected, radio link data related to the UE 10, such as information on load or congestions on a radio link to the UE 10, or the like.

In the illustrated scenario, the node 200 needs to subscribe at the node 100 to receive the desired information and generates a subscription message. At injection step 505, the node 200 injects the subscription message into a DL data packet 506 which is sent from the node 200 to the node 100. In the illustrated scenario, the subscription message corresponds to data destined to the node 100. The subscription message may be included into the DL data packet 506 using the functionalities as described in connection with FIG. 1. Accordingly, the DL data packet 506 is disguised as a DL data packet carrying user traffic to the UE 10, e.g., is generated by the node 200 to have the same structure as the DL data packet 503. This may in particular mean that the DL data packet is provided with the same type of protocol headers as the DL data packet 503 and carries the IP address of the UE 10 as destination address. Further, the DL data packet 506 is marked as including data destined to the node 100, e.g., by providing the DL data packet 506 with a specific protocol identifier and/or port number in the IP 5-tuple of the IP header of the data packet.

On the basis of the marking, the node 100 intercepts the DL data packet 506. That is to say, the node 100 identifies the DL data packet 506 as including data destined to the node 100 by detecting the marking, e.g., the specific protocol identifier and/or port number. As indicated by step 507, the node 100 then extracts the subscription message from the DL data packet 506. In the illustrated scenario, it is assumed that the DL data packet 506 is generated exclusively for the purpose of transmitting the subscription message. Accordingly, the subscription message may be included in a payload section of the DL data packet 506, and the node 100 may extract the subscription message from the payload section. Since the DL data packet carries no user traffic destined to the UE 10, the node 100 may discard the DL data packet 506 after extracting the subscription message. In particular, there is no need for the node 100 to forward the DL data packet 506 to the UE 10. Accordingly, in the scenario of FIG. 5 the inband data channel is used for conveying the subscription message from the node 200 to the node 100.

The node 100 then registers the node 200 for receiving the desired information. In the illustrated scenario, it is assumed that the subscription message, or the DL data packet 506 used for transmitting the subscription message, also includes an IP address of the node 200. Accordingly, the node 100 may for store this IP address in a list of subscribed nodes in order to accomplish the registration.

The node 100 may then obtain or generate the desired information. This may be accomplished immediately or triggered by one or more events, e.g., as defined in the subscription message. Examples of such events are a cell change of the UE 10, or detection of a traffic congestion.

As illustrated by injection steps 508 and 512, the node 100 then includes the desired information into one or more UL data packets 509 and 513 sent to the node 200. This may be accomplished using functionalities as described in connection with FIG. 2. The UL data packets 509, 513 may be disguised as UL data packets carrying user traffic from the UE 10. For this purpose, the UL data packets 509, 513 may carry a source address, e.g., in the inner IP header 350, corresponding to the IP address of the UE 10. Further, the UL data packets 509, 513 may be provided with the same structure as the UL data packet 502, e.g., by being provided with the same type of protocol headers as the DL data packet 503.

In FIG. 5, two different ways of including the desired information into a UL data packet are illustrated by way of example. In the case of injection step 508 and UL data packet 509, the UL data packet is generated at the node 100 and is used exclusively for the purpose of transmitting the desired information from the node 100 to the node 200. Accordingly, the UL data packet 509 carries no user traffic from the UE 10. In the case of injection step 512 and UL data packet 513, the information is piggy backed into a UL data packet 511 carrying user traffic from the UE 10 to the node 200. For this purpose, the node 100 receives UL data packet 511 from the UE 10, injects the desired information at step 512, and forwards the received UL data packet with the included information as the UL data packet 513. Piggy backing of the information may be accomplished as explained above, e.g., on the TCP level by locally altering TCP bits or flags or on the HTTP level by HTTP header enrichment. The node 100 may control the piggy backing information on the basis of capabilities of the node 200, which may for example be indicated to the node 100 in the subscription message. Accordingly, the inband data channel from the node 200 to the node 100 may be used to control the piggy backing of information into UL data packets transmitted from the node 100 to the node 200.

As illustrated by extraction steps 510 and 514, the node 200 extracts the desired information from the UL data packets 509 and 513, e.g., using functionalities as explained in connection with FIG. 2. If piggy backing is used as in the case of UL data packet 513, this may also involve undoing modifications of the UL data packet as accomplished when injecting the information. For example, alterations of TCP bits or flags may be undone or supplemental information elements in a HTTP header may be removed. After extracting the information at step 514, the UL data packet 514 may be forwarded to further processing in the node 200 or forwarded to some other node.

Figure 6:
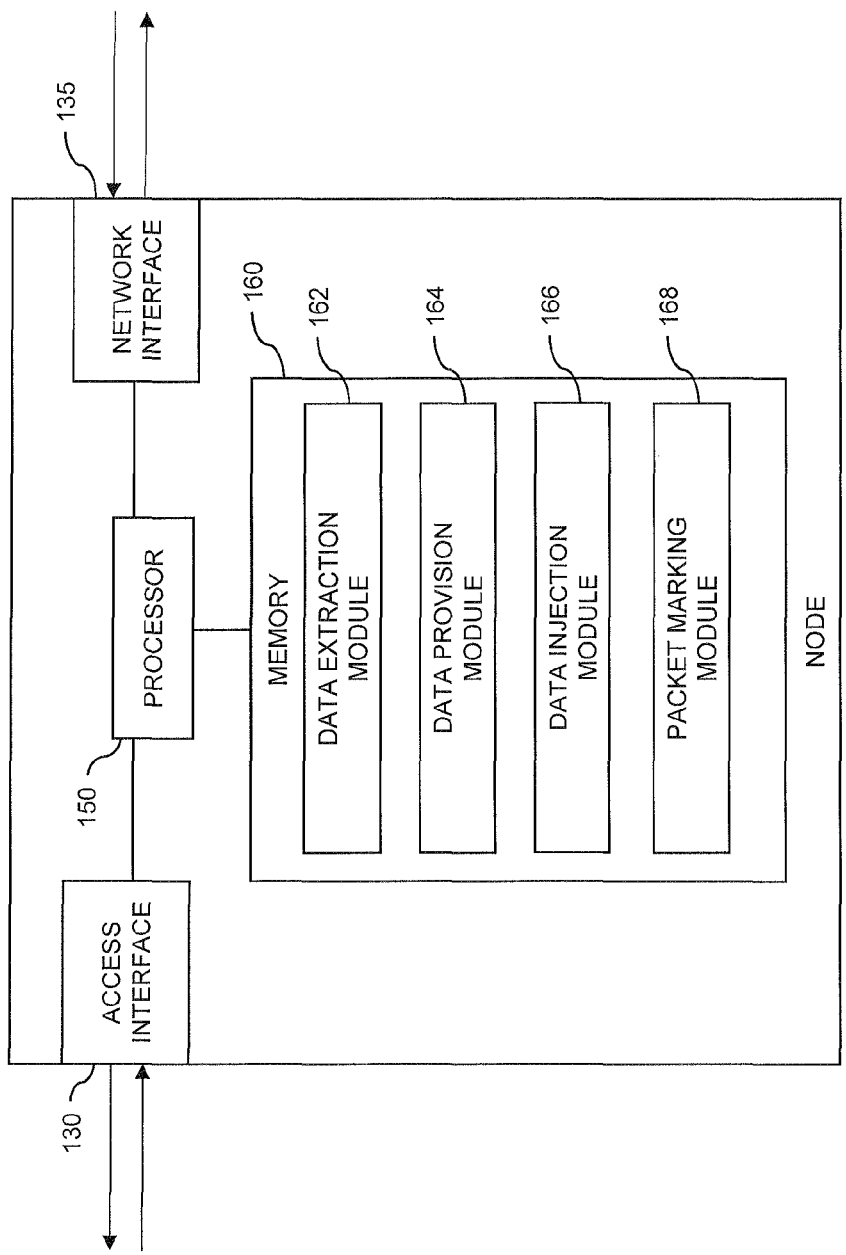
FIG. 6 schematically illustrates a mobile network node according to an embodiment of the invention.

FIG. 6 illustrates an implementation of a mobile network node according to an embodiment of the invention. For example, the mobile network node may correspond to the RAN node 100 of FIG. 1 or 2, and may also implement functionalities of the data extraction processor 110 and/or of the data injection processor 120.

In the illustrated implementation, the mobile network node includes an access interface 130 to send data packets to a UE connected to the mobile network and to receive data packets from the UE connected to the mobile network. In addition, the mobile network node also includes a network interface 135 to send data packets to a further node inside or outside the mobile network, and to receive data packets from a further node inside or outside the mobile network. Accordingly, user traffic to or from the UE may be passed through the mobile network node.

Further, the mobile network node includes a processor 150 coupled to the interfaces 130, 135 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities transmitting data using the inband data channel. More specifically, the memory 160 may include a data extraction module 162 so as to implement the above-described functionalities of extracting data from DL data packets, e.g., as accomplished by the data extraction processor 110. Further, the memory 160 may include a data provision module 164 so as to implement functionalities of locally generating data to be transmitted by the mobile network node. Further, the memory may also include a data injection module 166 and a packet marking module 168 so as to implement the above-described functionalities of injecting the data into UL data packets and marking the UL data packets accordingly. In some implementations either the data extraction module 162 or the data provision module 164, the data injection module 166, and the packet marking module 168 may be omitted.

It is to be understood that the structure as illustrated in FIG. 6 is merely schematic and that the mobile network node may actually include further components which, for the sake of clarity, have not been illustrated, e.g., further interfaces. Also, it is to be understood that the memory 160 may include further types of program code modules, which have not been illustrated, e.g., program code modules for implementing known functionalities of a mobile network node.

Figure 7:
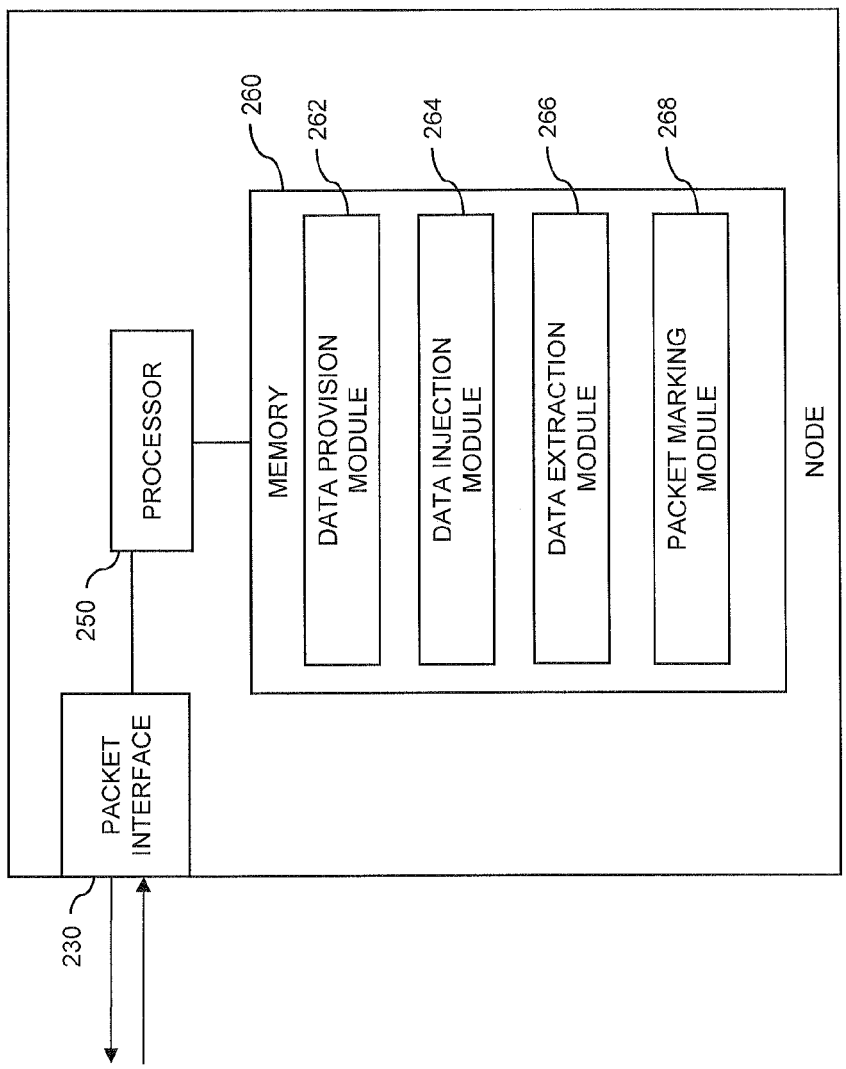
FIG. 7 schematically illustrates a further node according to an embodiment of the invention.

FIG. 7 illustrates an implementation of a further node according to an embodiment of the invention. For example, the node may correspond to the AF node 200 of FIG. 1 or 2, and may also implement functionalities of the data injection processor 210 and/or of the data extraction processor 220.

In the illustrated implementation, the node includes an packet interface 230 to send data packets to a UE connected to a mobile network and to receive data packets from the UE connected to the mobile network.

Further, the node includes a processor 250 coupled to the packet interface 230 and a memory 260 coupled to the processor 250. The memory 260 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 260 includes suitably configured program code to be executed by the processor 250 so as to implement the above-described functionalities transmitting data using the inband data channel. More specifically, the memory 260 may include a data extraction module 262 so as to implement the above-described functionalities of extracting data from UL data packets, e.g., as accomplished by the data extraction processor 220. Further, the memory 260 may include a data provision module 264 so as to implement functionalities of locally generating data to be transmitted to a node of the mobile network. Further, the memory 260 may also include a data injection module 266 and a packet marking module 268 so as to implement the above-described functionalities of injecting the data into DL data packets and marking the DL data packets accordingly. In some implementations either the data extraction module 262 or the data provision module 264, the data injection module 266, and the packet marking module 268 may be omitted.

It is to be understood that the structure as illustrated in FIG. 7 is merely schematic and that the node may actually include further components which, for the sake of clarity, have not been illustrated, e.g., further interfaces. Also, it is to be understood that the memory 260 may include further types of program code modules, which have not been illustrated, e.g., program code modules for implementing known functionalities of an AF node.

Figure 8:
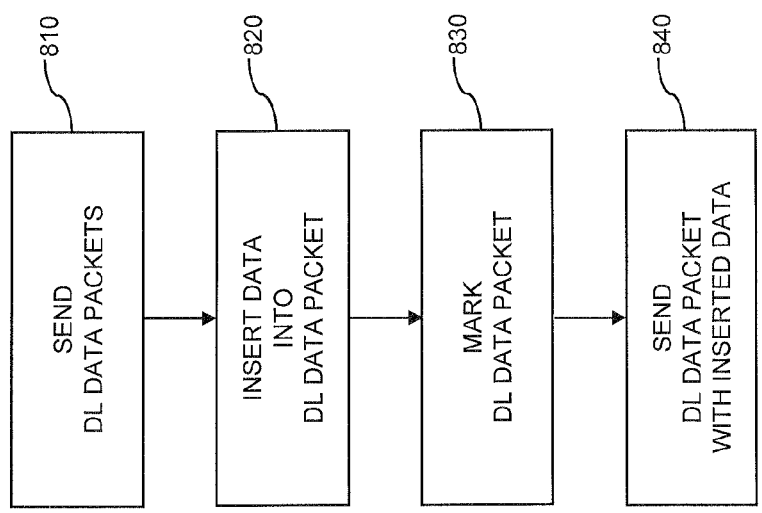
FIG. 8 shows a flowchart for schematically illustrating a method according to an embodiment of the invention.

FIG. 8 shows a flowchart for illustrating a method of transmitting data between a node of a mobile network and a further node, in particular in a DL direction from the further node to the node of the mobile network. The method may be used to implement functionalities of the further node, e.g., of the AF node 200 as explained in connection with FIG. 1.

As illustrated by step 810, the further node may send DL data packets to the node. The DL data packets carry a destination address corresponding to a network address of a UE connected to the mobile network. For example, if the node of the mobile network is a RAN node, e.g., as the RAN node 100, the UE may be connected to the RAN. The UE may be in active mode or in idle mode, i.e., the UE does not need to actively use this network address.

At step 820, the further node inserts data destined to the node of the mobile network into a DL data packets. This DL data packet may be one of the DL data packets of step 810 or may be a dedicated DL data packet carry a destination address corresponding to the UE. For example, the data may correspond to a request for certain information from the node of the mobile network, such as the subscription message included in DL data packet 506 of FIG. 5. The data may also correspond to other data available at the further node, e.g., information relating to services hosted by the further node. The data may be inserted into a payload section of a dedicated DL data packet not carrying user traffic to the UE, or may be piggy backed into a DL data packet carrying user traffic to the UE, e.g., by alteration of bits of a TCP header or inserting the data into a HTTP header.

At step 830, the further node marks the DL data packet as including data destined to the node of the mobile network. This may for example be accomplished by modifying a protocol header of the UL data packet, e.g., by using a certain protocol identifier and/or port number in an IP header of the DL data packet.

At step 840, the further node sends the DL data packet with the inserted data to the node of the mobile network. This may be accomplished via an intermediate node, such as the gateway 180 of FIG. 1. In some scenarios, the further node may schedule sending of the DL data packet depending on an activity status of the UE, e.g., depending on whether the UE is in idle mode or in active mode. For this purpose, the further node may obtain information on an activity status of the UE.

Figure 9:
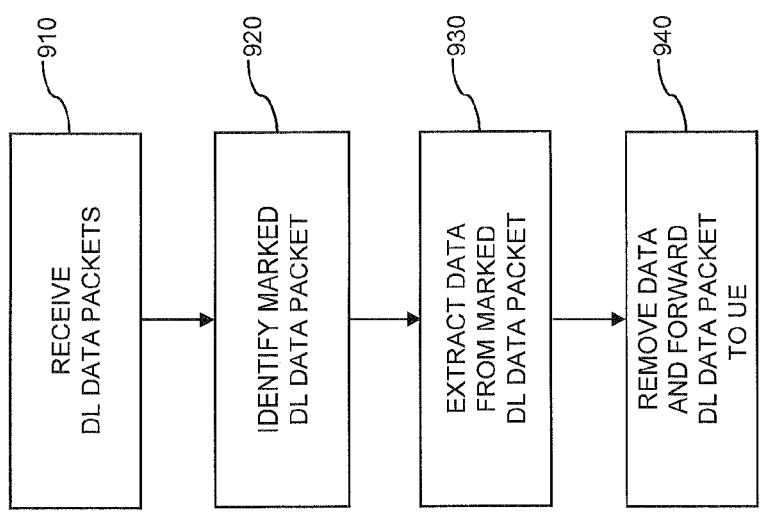
FIG. 9 shows a flowchart for schematically illustrating a further method according to an embodiment of the invention.

FIG. 9 shows a flowchart for illustrating a method of transmitting data between a node of a mobile network and a further node, in particular in a DL direction from the further node to the node of the mobile network. The method may be used to implement functionalities of the node of the mobile network, e.g., of the RAN node 100 as explained in connection with FIG. 1.

As illustrated by step 910, the node of the mobile network may receive DL data packets from the further node. The DL data packets carry a destination address corresponding to a network address of a UE connected to the mobile network. For example, if the node of the mobile network is a RAN node, e.g., as the RAN node 100, the UE may be connected to the RAN. The UE may be in active mode or in idle mode, i.e., the UE does not need to actively use this network address.

At step 920, the node of the mobile network identifies at least one DL data packet as including data destined to the node of the mobile network. This is accomplished on the basis of a marking of the DL data packet. For example, the marking may be a modification in a protocol header of the DL data packet, e.g., by using a certain protocol identifier and/or port number in an IP header of the DL data packet.

At step 930, the node of the mobile network extracts the data destined to the node of the mobile network from the identified DL data packet. For example, the data may correspond to a request for certain information from the node of the mobile network, such as the subscription message included in DL data packet 506 of FIG. 5. The data may also correspond to other data available at the further node, e.g., information relating to services hosted by the further node. The data may for example be extracted from a payload section of the identified DL data packet, from bits of a TCP header of the identified DL data packets, or from a HTTP header of the identified DL data packet.

As illustrated by step 940, the node of the mobile network may further remove the data destined to the node of the mobile network from the identified DL data packet and then forward the data packet to the UE. This may for example be done when the data destined to the UE are piggy backed into DL data packets carrying user traffic to the UE. If the data destined to the node of the mobile network are inserted into the DL data packet by alteration of bits of a TCP header of the DL data packet, the removing of the data may be accomplished by undoing the alteration of the bits.

If the data extracted at step 930 corresponds to a request for information from the node of the mobile network, such as the subscription message included in DL data packet 506 of FIG. 5, the node of the mobile network may provide data including this information and send this data in DL data packets to the further node.

Figure 10:
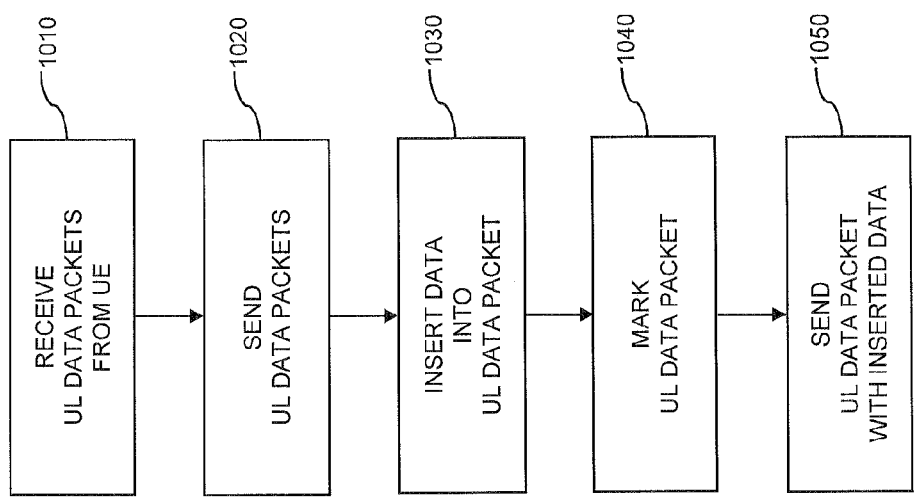
FIG. 10 shows a flowchart for schematically illustrating a further method according to an embodiment of the invention.

FIG. 10 shows a flowchart for illustrating a method of transmitting data between a node of a mobile network and a further node, in particular in a UL direction from the node of the mobile network to the further node. The method may be used to implement functionalities of the node of the mobile network, e.g., of the RAN node 100 as explained in connection with FIG. 2.

As illustrated by steps 1010 and 1020, the node of the mobile network may receive UL data packets from a UE connected to the mobile network and send these UL data packets to the further node, e.g., as with UL data packets 501 and 502 of FIG. 5. The UL data packets carry a source address corresponding to a network address of the UE. For example, if the node of the mobile network is a RAN node, e.g., as the RAN node 100, the UE may be connected to the RAN. The UE may be in active mode or in idle mode, i.e., the UE does not need to actively use this network address.

At step 1030, the node of the mobile network inserts data provided by the node of the mobile network into a UL data packet. This UL data packet may be one of the UL data packets of step 1010 or may be a dedicated UL data packet generated at the node of the mobile network and carrying a destination address corresponding to the UE. For example, the data provided by the node of the mobile network may correspond to a location of the UE or some other UE, e.g., in terms of a cell to which the UE is connected, or data related to a radio link established to the UE or some other UE. The data may be inserted into a payload section of a dedicated UL data packet not carrying user traffic from the UE, or may be piggy backed into a UL data packet carrying user traffic from the UE, e.g., by alteration of bits of a TCP header or inserting the data into a HTTP header. Before inserting the data into the UL data packet, the node may receive an indication that the further node is capable of extracting the data from the UL data packet. For example, in the process of FIG. 5, such an indication could be provided together with the subscription message.

At step 1040, the node of the mobile network marks the UL data packet as including data provided by the node of the mobile network. This may for example be accomplished by modifying a protocol header of the UL data packet, e.g., by using a certain protocol identifier and/or port number in an IP header of the UL data packet.

At step 1050, the node of the mobile network sends the UL data packet with the inserted data to the further node. This may be accomplished via an intermediate node, such as the gateway 180 of FIG. 2.

Figure 11:
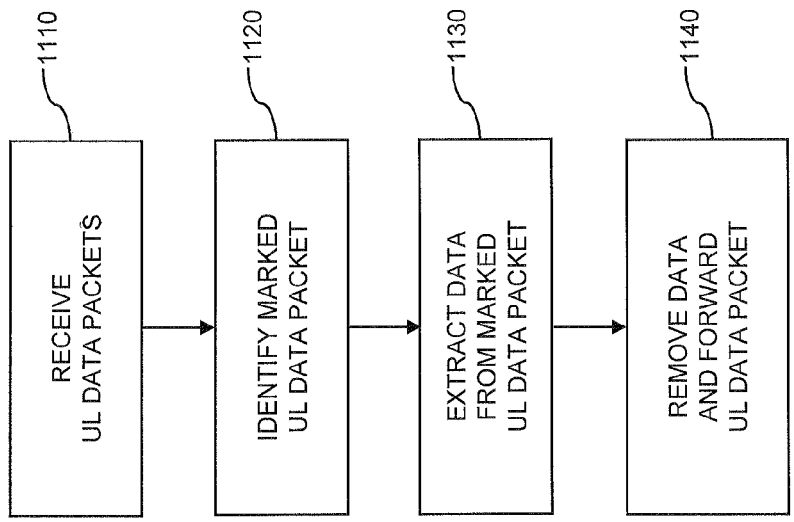
FIG. 11 shows a flowchart for schematically illustrating a further method according to an embodiment of the invention.

FIG. 11 shows a flowchart for illustrating a method of transmitting data between a node of a mobile network and a further node, in particular in a UL direction from the node of the mobile network to the further node. The method may be used to implement functionalities of the further node, e.g., of the AF node 200 as explained in connection with FIG. 2.

As illustrated by step 1010, the further node may receive UL data packets from the node of the mobile network. The UL data packets carry a source address corresponding to a network address of a UE connected to the mobile network. For example, if the node of the mobile network is a RAN node, e.g., as the RAN node 100, the UE may be connected to the RAN. The UE may be in active mode or in idle mode, i.e., the UE does not need to actively use this network address.

At step 1120, the further node identifies at least one UL data packet as including data provided by the node of the mobile network. This is accomplished on the basis of a marking of the UL data packet. For example, the marking may be a certain modification in a protocol header of the UL data packet, such as by using a certain protocol identifier and/or port number in an IP header of the UL data packet.

At step 1130, the further node extracts the data provided by the node of the mobile network from the identified UL data packet. For example, the data may correspond to a location of the UE or some other UE, e.g., in terms of a cell to which the UE is connected, or data related to a radio link established to the UE or some other UE. The data may for example be extracted from a payload section of the identified UL data packet, from bits of a TCP header of the identified UL data packet, or from a HTTP header of the identified UL data packet.

As illustrated by step 1140, the further node may further remove the data provided by the node of the mobile network from the identified UL data packet and then forward the data packet, e.g., to higher layer processing in the further node, or to some other node. This may for example be done when the data destined to the UE are piggy backed into UL data packets carrying user traffic from the UE. If the data destined to the node of the mobile network are inserted into the UL data packet by alteration of bits of a TCP header of the UL data packet, the removing of the data may be accomplished by undoing the alteration of the bits.

The methods of FIGS. 8, 9, 10, and 11 may be combined to each other as appropriate. For example, the methods of FIGS. 8 and 9 could be combined to accomplish transmission of the data destined to the node of the mobile network in a DL direction by using the method of FIG. 8 to insert the data into the DL data packets and the method of FIG. 9 to extract the data from the DL data packets. Similarly, the methods of FIGS. 10 and 11 could be combined to accomplish transmission of the data provided by the node of the mobile network in a UL direction by using the method of FIG. 10 to insert the data into the UL data packets and the method of FIG. 11 to extract the data from the UL data packets. Further, the methods of FIGS. 8 and 10, and/or the methods of FIGS. 9 and 11 could be combined to accomplish exchange of data between the node of the mobile network and the further node in both the DL and the UL direction.

As can be seen from the above, the concepts according to embodiments of the invention as described herein allow for implementing transmission of data between a node of a mobile network and a further node with little impact on the network architecture. Typically, only nodes acting as endpoints of the inband data channel, e.g., the RAN node 100 and the AF node 200, need to be adapted for implementing the concepts. In addition control plane scalability issues in the mobile network may be avoided as data is sent using the same protocols as user traffic. Further, there is no need for processing of user traffic by dedicated hardware. Further, various mechanisms of injecting the data into the inband data channel can be used, e.g., dedicated data packets or piggy backing on the TCP or HTTP level, thereby allowing flexible adaptation to different traffic scenarios.

It is to be understood that the examples and embodiments as explained above are merely illustrative and susceptible to various modifications. For example, the data injected into the inband data channel using data packets disguised as being directed to or coming from a certain UE could actually pertain to another UE and/or to multiple UEs. In addition, it is to be understood that the above concepts may be implemented by using correspondingly designed software in existing network devices, or by using dedicated network device hardware.

The invention claimed is:

1. A method at a node of a mobile network, the method comprising communicating with a further node using an in-band communication channel implicitly defined in a packet flow going between the further node and a user equipment that is connected to the mobile network, said communicating including at least one of:

receiving data from the further node via the in-band communication channel by receiving a downlink data packet in the packet flow, the downlink data packet being addressed to the user equipment, recognizing that the downlink data packet is a disguised downlink data packet that is at least partly targeted to the node rather than being solely targeted to the user equipment, based on detecting that the downlink data packet is marked as belonging to the in-band communication channel, and, in response, extracting data from the disguised downlink data packet that is targeted to the node and acting on the extracted data at the node, rather than delivering or forwarding the extracted data to the user equipment; and sending data to the further node via the in-band communication channel by forming a disguised uplink data packet having a source address of the user equipment but being marked as belonging to the in-band communication channel, and inserting data provided by the node and targeted for the further node into the disguised uplink data packet, and sending the disguised uplink data packet in the packet flow towards the further node.

2. The method of claim 1, wherein, when receiving data from the further node via the in-band communication channel, the method includes determining that the disguised downlink data packet includes additional data that is targeted to the user equipment, and, in response, removing the extracted data from the disguised downlink data packet, to obtain a corresponding downlink data packet for the user equipment that includes the additional data targeted to the user equipment, and forwarding or delivering the corresponding downlink data packet to the user equipment.

3. The method according to claim 2, wherein the data targeted to the node are inserted into the disguised downlink data packet by alteration of bits of a Transport Control Protocol header of the disguised downlink data packet, and wherein said removing is accomplished by undoing the alteration of the bits.

4. The method according to claim 1, wherein the data targeted to the node includes a request by the further node for data provided by the node, and wherein the method further comprises performing the step of sending data to the further node via the in-band communication channel in response to receiving the request by the further node.

5. The method according to claim 4, wherein forming the disguised uplink data packet comprises forming the disguised uplink data packet from an uplink data packet sent from the user equipment, such that the disguised uplink data packet includes the inserted data and data originating from the user equipment.

6. The method according to claim 1, wherein the node is a radio access network node.

7. The method of claim 1, wherein the node is a base station through which the user equipment is connected to the mobile network.

8. The method according to claim 1, wherein inserting the data provided by the node and intended for the further node into the disguised uplink data packet comprises inserting the data into a Transport Control Protocol header of the disguised uplink data packet, by alteration of bits of the Transport Control Protocol header.

9. The method according to claim 1, wherein inserting the data provided by the node and intended for the further node into the disguised uplink data packet comprises inserting the data into a Hypertext Transfer Protocol header of the disguised uplink data packet.

10. The method according to claim 1, wherein given downlink or uplink data packets in the packet flow are marked as belonging to the in-band communication channel, based on modifying a protocol header of the given downlink or uplink data packets.

11. The method according to claim 1, wherein the step of sending data to the further node via the in-band communication channel comprises scheduling the sending of data to the further node via the in-band communication channel in dependence on an activity status of the user equipment.

12. The method according to claim 11, further comprising informing the further node as to the activity status of the user equipment, based on communicating with the further node via the in-band communication channel.

13. A node configured for operation in a mobile network, the node comprising:
communication circuitry including a network interface towards a further node; and
processing circuitry operatively associated with the communication interface circuitry and configured to communicate with the further node using an in-band communication channel implicitly defined in a packet flow going between the further node and a user equipment that is connected to the mobile network;
the processing circuitry being particularly configured to perform at least one of:
receive data from the further node via the in-band communication channel by receiving a downlink data packet in the packet flow, the downlink data packet being addressed to the user equipment, recognize that the downlink data packet is a disguised downlink data packet that is at least partly targeted to the node rather than being solely targeted to the user equipment, based on detecting that the downlink data packet is marked as belonging to the in-band communication channel, and, in response, extract data from the disguised downlink data packet that is targeted to the node and act on the extracted data at the node, rather than delivering or forwarding the extracted data to the user equipment; and
send data to the further node via the in-band communication channel by forming a disguised uplink data packet having a source address of the user equipment but being marked as belonging to the in-band communication channel, and insert data provided by the node and targeted for the further node into the disguised uplink data packet, and send the disguised uplink data packet in the packet flow towards the further node.

14. The node according to claim 13, wherein, when receiving data from the further node via the in-band communication channel, the processing circuitry is configured to determine that the disguised downlink data packet includes additional data that is targeted to the user equipment, and, in response, remove the extracted data from the disguised downlink data packet, to obtain a corresponding downlink data packet for the user equipment that includes the additional data targeted to the user equipment, and forward or deliver the corresponding downlink data packet to the user equipment.

15. The node according to claim 14, wherein the data targeted to the node are inserted into the disguised downlink data packet by alteration of bits of a Transport Control Protocol header of the disguised downlink data packet, and wherein the processing circuitry is configured to remove the data targeted to the node by undoing the alteration of the bits.

16. The node according to claim 13, wherein the data targeted to the node includes a request by the further node for data provided by the node, and wherein the processing circuitry is configured to send data to the further node via the in-band communication channel in response to receiving the request by the further node.

17. The node according to claim 16, wherein the processing circuitry is configured to form the disguised uplink data packet by forming the disguised uplink data packet from an uplink data packet sent from the user equipment, such that the disguised uplink data packet includes the inserted data and data originating from the user equipment.

18. The node according to claim 13, wherein the node is a radio access network node.

19. The node according to claim 13, wherein the node is a base station configured to connect the user equipment to the mobile network.

20. The node according to claim 13, wherein the processing circuitry is configured to insert the data provided by the node and intended for the further node into the disguised uplink data packet by inserting the data into a Transport Control Protocol header of the disguised uplink data packet, by alteration of bits of the Transport Control Protocol header.

21. The node according to claim 13, wherein the processing circuitry is configured to insert the data provided by the node and intended for the further node into the disguised uplink data packet by inserting the data into a Hypertext Transfer Protocol header of the disguised uplink data packet.

22. The node according to claim 13, wherein given downlink or uplink data packets in the packet flow are marked as belonging to the in-band communication channel, based on having a modified protocol header.

23. The node according to claim 13, wherein the processing circuitry is configured to schedule its sending of data to the further node via the in-band communication channel in dependence on an activity status of the user equipment.

24. The node according to claim 23, wherein the processing circuitry is configured to inform the further node as to the activity status of the user equipment, based on communicating with the further node via the in-band communication channel.

25. A method at a further node, said method comprising communicating with a node in a mobile network using an in-band communication channel implicitly defined in a packet flow going between the further node and a user equipment that is connected to the mobile network, said communicating including at least one of:

receiving data from the node in the mobile network via the in-band communication channel, based on receiving an uplink data packet in the packet flow, recognizing that the uplink data packet is a disguised uplink data packet, based on the uplink data packet having a source address of the user equipment but being marked as belonging to the in-band communication channel, and, in response to said recognizing, extracting data from the disguised downlink data packet that is provided by the node rather than the user equipment, and processing the extracted data as in-band communication data from the node; and sending data to the node via the in-band communication channel by forming a disguised downlink data packet having a destination address of the user equipment but being marked as belonging to the in-band communication channel, and inserting data targeted to the node rather than the user equipment into the disguised downlink data packet, and sending the disguised downlink data packet in the packet flow towards the node.

26. A further node configured for supporting a packet flow with a user equipment that communicatively couples to the further node via a mobile network, said node comprising:

communication circuitry including a network interface configured to communicatively couple the further node to the mobile network; and processing circuitry operatively associated with the communication circuitry and configured to communicate with a node in a mobile network using an in-band communication channel implicitly defined in the packet flow going between the further node and the user equipment that is connected to the mobile network;

the processing circuitry being particularly configured to perform at least one of:

receive data from the node in the mobile network via the in-band communication channel, based on receiving an uplink data packet in the packet flow, recognizing that the uplink data packet is a disguised uplink data packet, based on the uplink data packet having a source address of the user equipment but being marked as belonging to the in-band communication channel, and, in response to said recognizing, extracting data from the disguised downlink data packet that is provided by the node rather than the user equipment, and processing the extracted data as in-band communication data from the node; and send data to the node via the in-band communication channel by forming a disguised downlink data packet having a destination address of the user equipment but being marked as belonging to the in-band communication channel, and inserting data targeted to the node rather than the user equipment into the disguised downlink data packet, and sending the disguised downlink data packet in the packet flow towards the node.

* * * * *